US009734548B2

(12) United States Patent
Hakura et al.

(10) Patent No.: US 9,734,548 B2
(45) Date of Patent: Aug. 15, 2017

(54) CACHING OF ADAPTIVELY SIZED CACHE TILES IN A UNIFIED L2 CACHE WITH SURFACE COMPRESSION

(71) Applicant: NVIDIA CORPORATION, Santa Clara, CA (US)

(72) Inventors: Ziyad S. Hakura, Gilroy, CA (US); Rouslan Dimitrov, Santa Clara, CA (US); Emmett M. Kilgariff, San Jose, CA (US); Andrei Khodakovsky, Belmont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 14/012,308

(22) Filed: Aug. 28, 2013

(65) Prior Publication Data

US 2014/0118379 A1 May 1, 2014

Related U.S. Application Data

(60) Provisional application No. 61/719,271, filed on Oct. 26, 2012.

(51) Int. Cl.
*G06T 1/60* (2006.01)
*G06T 15/00* (2011.01)
(Continued)

(52) U.S. Cl.
CPC .............. *G06T 1/60* (2013.01); *G06T 15/005* (2013.01); *G06F 12/0875* (2013.01); *G06F 12/0897* (2013.01); *G09G 2360/121* (2013.01)

(58) Field of Classification Search
CPC .......... G06T 1/60; G06T 15/005; G06T 15/04; G06T 15/0005; G06F 12/0875; G06F 12/0897; G09G 2360/121
See application file for complete search history.

(56) References Cited

U.S. PATENT DOCUMENTS 6,323,860 B1   11/2001   Zhu et al.
6,535,209 B1   3/2003    Abdalla et al.
(Continued)

OTHER PUBLICATIONS

Exploiting Spatial Locality in Data Caches using Spatial Footprints. ISCA '98 Proceedings of the 25th annual international symposium on Computer architecture, pp. 357-368, Kumar et al.*

(Continued)

*Primary Examiner* — Saptarshi Mazumder
(74) *Attorney, Agent, or Firm* — Artegis Law Group, LLP

(57) ABSTRACT

One embodiment of the present invention includes techniques for adaptively sizing cache tiles in a graphics system. A device driver associated with a graphics system sets a cache tile size associated with a cache tile to a first size. The detects a change from a first render target configuration that includes a first set of render targets to a second render target configuration that includes a second set of render targets. The device driver sets the cache tile size to a second size based on the second render target configuration. One advantage of the disclosed approach is that the cache tile size is adaptively sized, resulting in fewer cache tiles for less complex render target configurations. Adaptively sizing cache tiles leads to more efficient processor utilization and reduced power requirements. In addition, a unified L2 cache tile allows dynamic partitioning of cache memory between cache tile data and other data.

21 Claims, 8 Drawing Sheets

(51) Int. Cl.
 *G06F 12/0875* (2016.01)
 *G06F 12/0897* (2016.01)

(56) References Cited

U.S. PATENT DOCUMENTS

| | | | |
|---|---|---|---|
| 6,674,443 B1* | 1/2004 | Chowdhuri et al. | 345/557 |
| 6,697,063 B1 | 2/2004 | Zhu et al. | |
| 6,885,378 B1* | 4/2005 | Tsai et al. | 345/557 |
| 7,102,646 B1 | 9/2006 | Rubinstein et al. | |
| 7,170,515 B1 | 1/2007 | Zhu et al. | |
| 7,634,621 B1* | 12/2009 | Coon | G06F 9/3012 |
| | | | 711/149 |
| 7,649,537 B2* | 1/2010 | Campbell et al. | 345/502 |
| 7,808,507 B1* | 10/2010 | Van Dyke et al. | 345/558 |
| 8,605,102 B1 | 12/2013 | Purcell et al. | |
| 2006/0026360 A1* | 2/2006 | Morris et al. | 711/133 |
| 2009/0058848 A1 | 3/2009 | Howson | |
| 2009/0303245 A1* | 12/2009 | Soupikov et al. | 345/582 |
| 2010/0164949 A1* | 7/2010 | Min | G06T 15/005 |
| | | | 345/419 |
| 2010/0169608 A1 | 7/2010 | Kuo et al. | |

OTHER PUBLICATIONS

Non-Final Office Action for U.S. Appl. No. 14/045,361 dated Feb. 26, 2016.
Non-Final Office Action for U.S. Appl. No. 14/046,249 dated May 10, 2016.

\* cited by examiner

US 9,734,548 B2

CACHING OF ADAPTIVELY SIZED CACHE TILES IN A UNIFIED L2 CACHE WITH SURFACE COMPRESSION

CROSS-REFERENCE TO RELATED APPLICATIONS

This application claims benefit of U.S. provisional patent application Ser. No. 61/719,271, filed Oct. 26, 2012 and titled "An Approach for Tiled Caching." The subject matter of this related application is hereby incorporated herein by reference.

BACKGROUND OF THE INVENTION

Field of the Invention

Embodiments of the present invention relate generally to graphics processing and, more specifically, to caching of adaptively sized cache tiles in a unified L2 cache with surface compression.

Description of the Related Art

Some graphics subsystems for rendering graphics images implement a tiling architecture, where one or more render targets, such as a frame buffer, are divided into screen space partitions referred to as tiles. In such a tiling architecture, the graphics subsystem rearranges work such that the work associated with any particular tile remains in an on-chip cache for a longer time than with an architecture that does not rearrange work in this manner. This rearrangement helps to improve memory bandwidth as compared with a non-tiling architecture.

Typically, the set of render targets changes over time as the rendering of the image progresses. For example, a first pass could use a first configuration of render targets to partially render the image. A second pass could use a second configuration of render targets to further render the image. A third pass could use a third set of render targets to complete the final rendering of the image. During the rendering process, the computer graphics subsystem could use up to fifty or more different render target configurations to render the final image. Each different render target configuration consumes a different amount of memory. To increase the likelihood that work remains in the on-chip cache, tiles are typically sized to accommodate the most complex configuration of render targets used during image rendering. As a result, the tiles are sized to accommodate all of the various render target configurations used during rendering of the final image—from the most complex to the least complex render target configuration.

One drawback to the above approach is that tiles are inefficiently sized for less complex render target configurations. Among other things, less complex render target configurations do not need the smaller tile size needed for more complex render target configurations in order for the work to stay resident in the cache during the rendering process. With a smaller tile size, more tiles are needed to cover the full screen space, as compared with a larger tile size where fewer tiles are needed to cover the same screen space. The smaller tile size leads to increased computing overhead, because computing requirements increase as the number of tiles increases. As a result, computing power is wasted for less complex render target configurations.

As the foregoing illustrates, what is needed in the art is a technique for more efficiently utilizing cache memory in a graphics subsystem that employs a tiling architecture.

SUMMARY OF THE INVENTION

One embodiment of the present invention sets forth a method for adaptively sizing cache tiles in a graphics system. The method includes setting a cache tile size associated with a first cache tile to a first size. The method further includes detecting a change from a first render target configuration that includes a first set of render targets to a second render target configuration that includes a second set of render targets. The method further includes setting the cache tile size to a second size based on the second render target configuration.

Other embodiments include, without limitation, a computer-readable medium that includes instructions that enable a processing unit to implement one or more aspects of the disclosed methods. Other embodiments include, without limitation, a subsystem that includes a processing unit configured to implement one or more aspects of the disclosed methods as well as a system configured to implement one or more aspects of the disclosed methods.

One advantage of the disclosed approach is that the cache tile size is adaptively sized based on render target configuration and cache configuration. Smaller cache tile sizes are selected for more complex render target configurations, while larger cache tile sizes are selected for less complex render target configurations. By adaptively sizing the cache tile based on the render target configuration, less compute power is needed to process the cache tiles, resulting in more efficient processor utilization and reduced power requirements.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
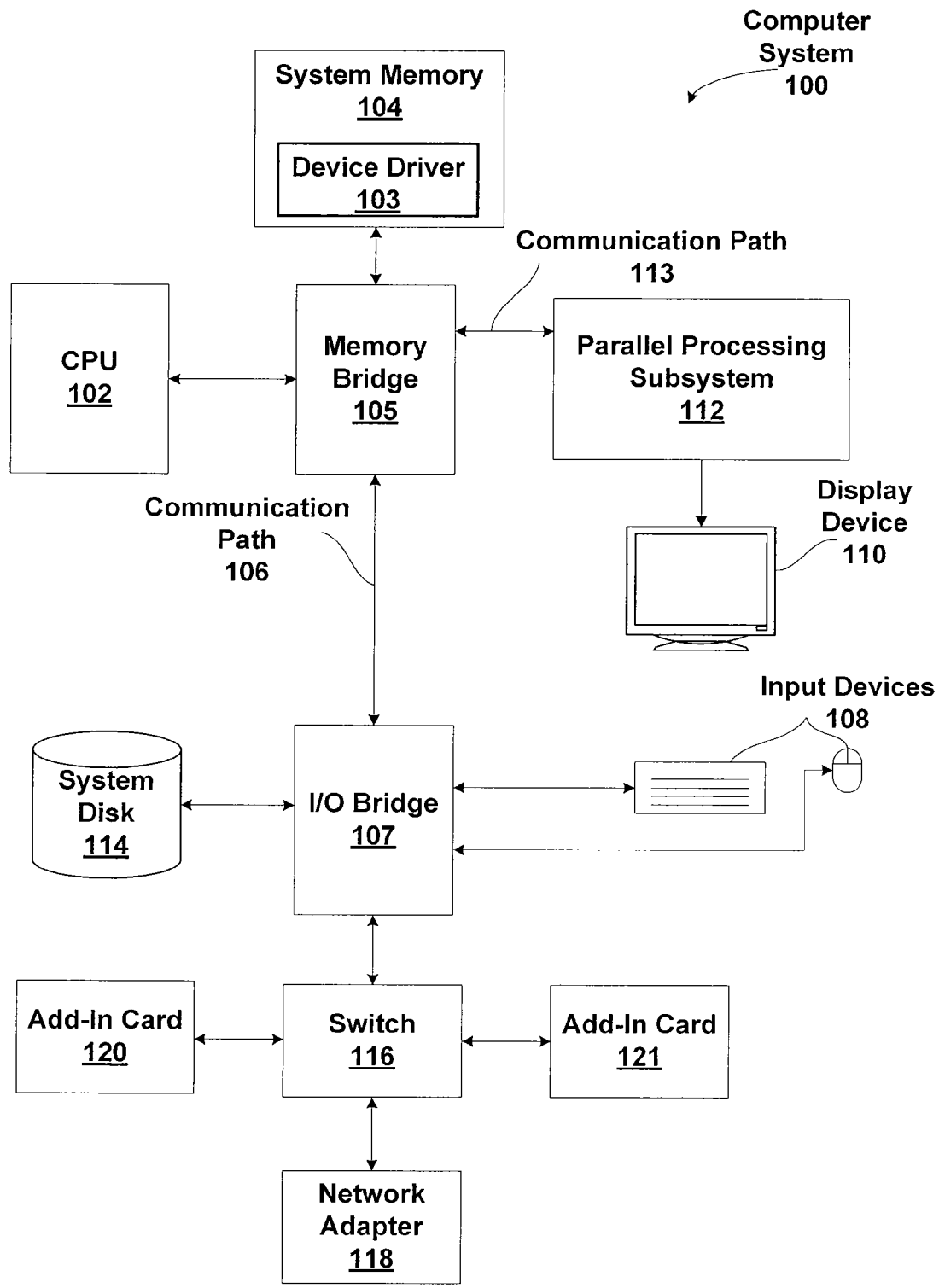
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
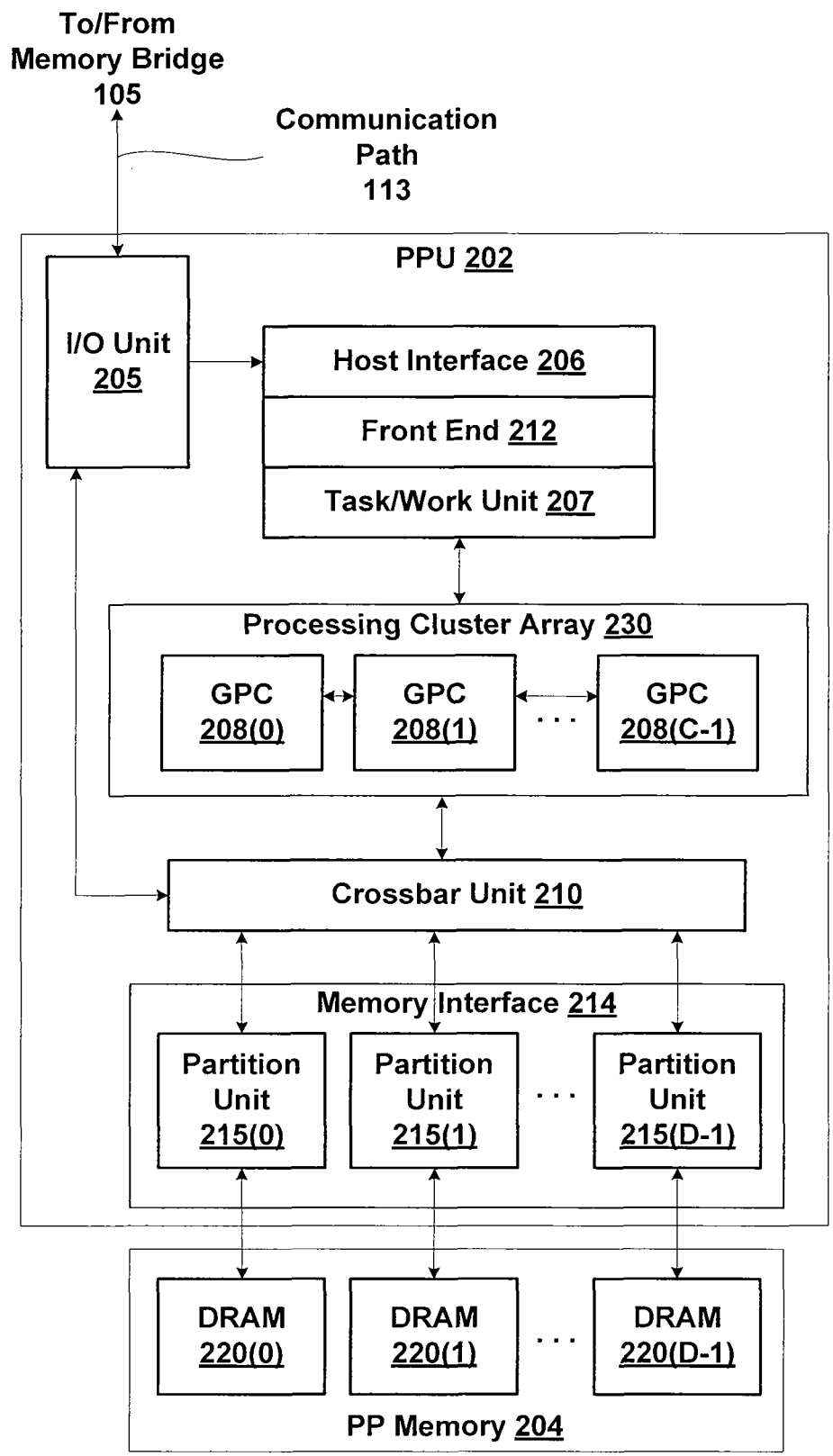
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
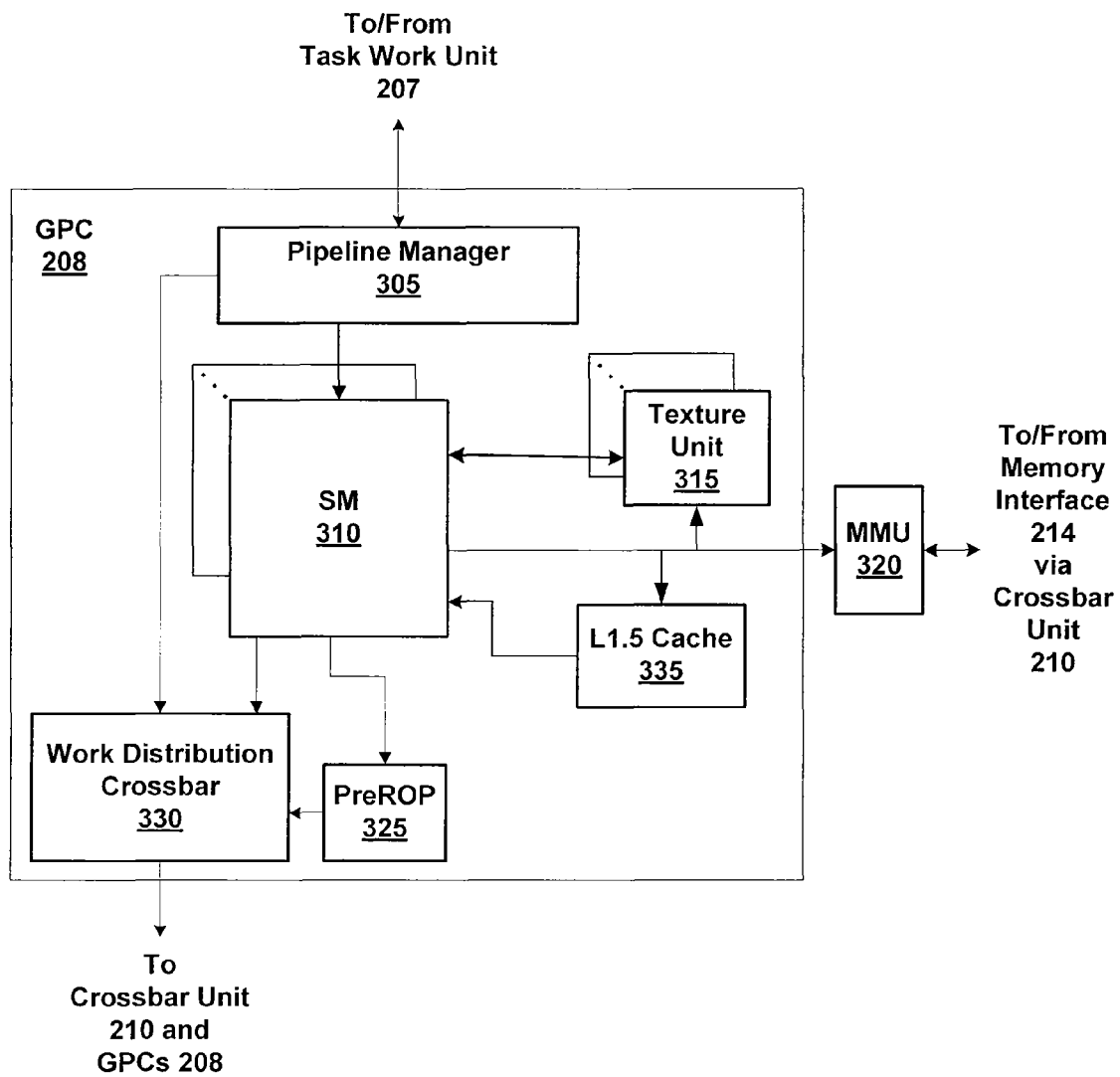
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
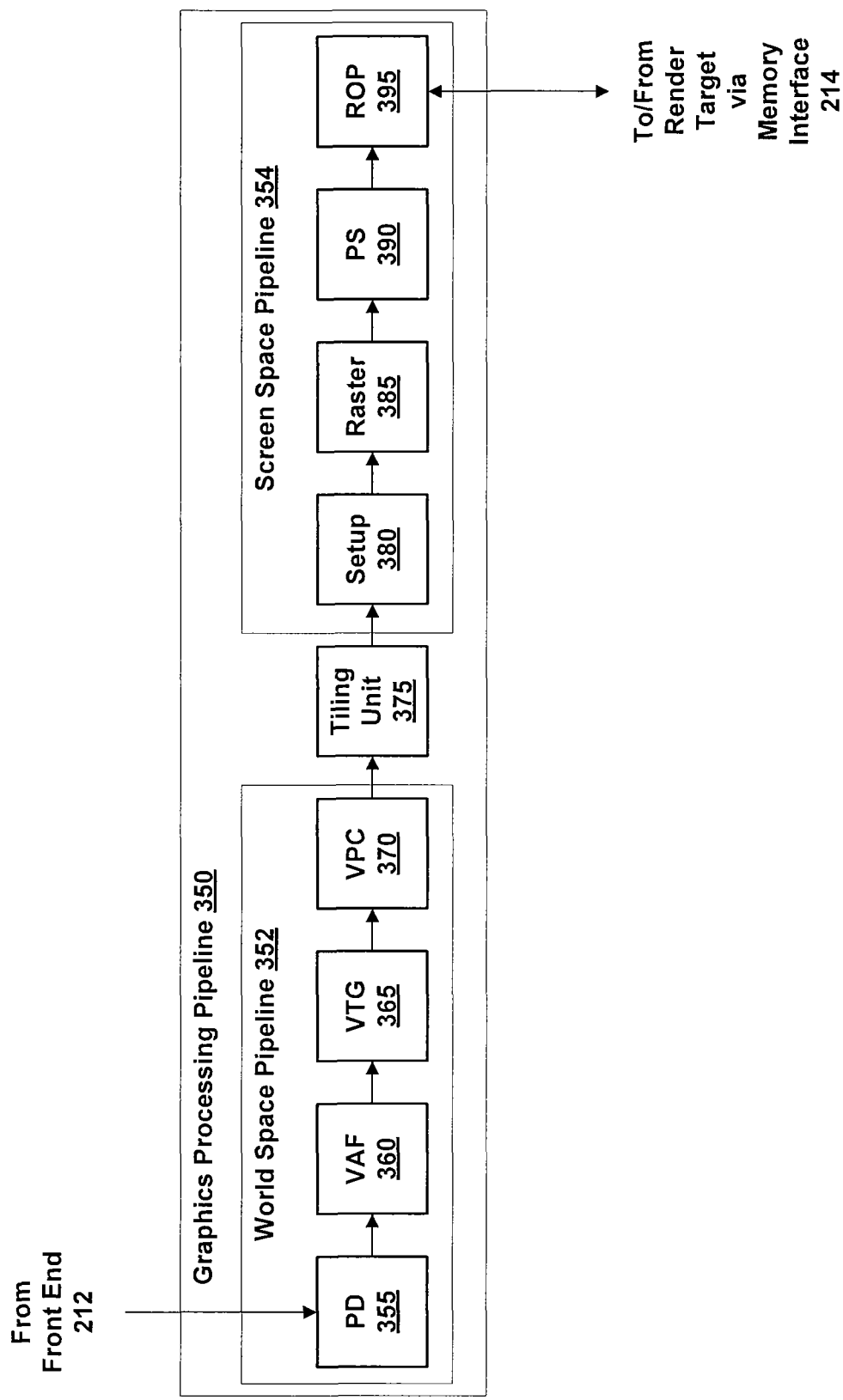
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD)

355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives, as well as color values, surface normal vectors, and transparency values at each vertex for the graphics primitives, for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

Figure 4:
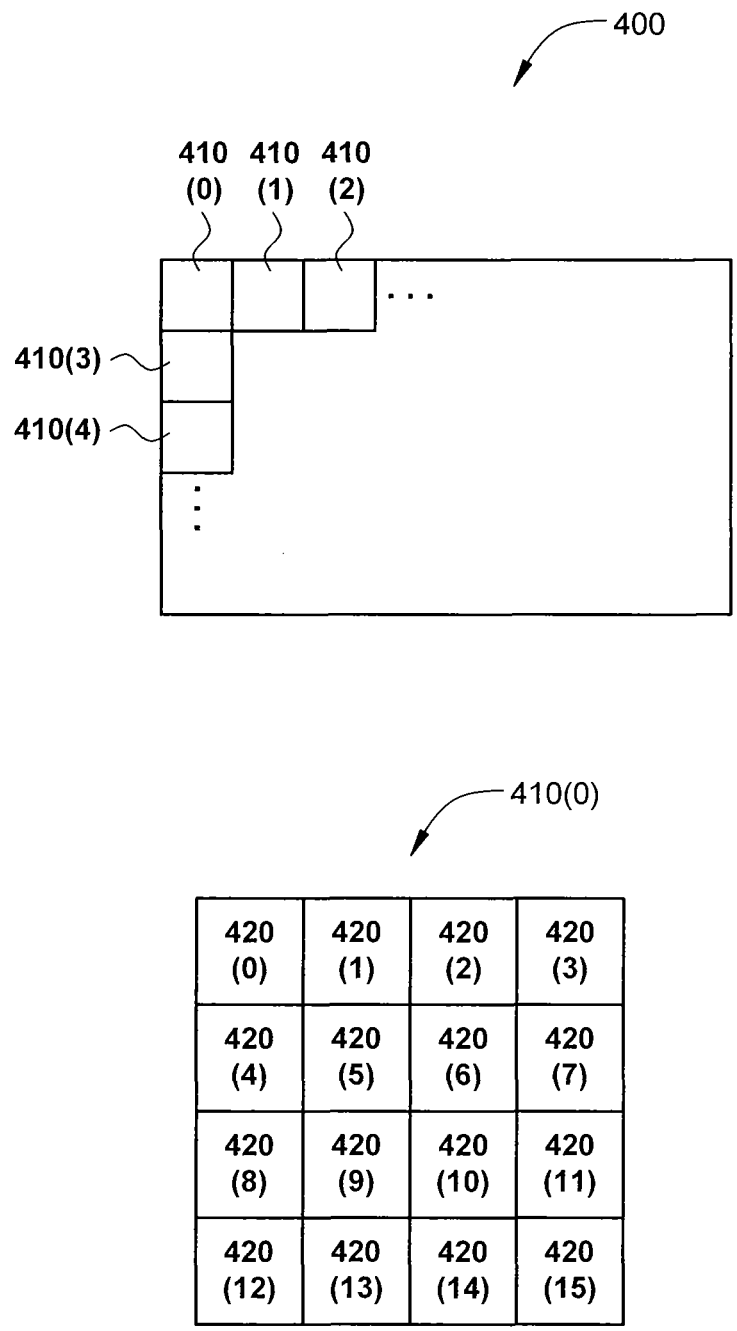
FIG. 4 is a conceptual diagram of a cache tile that the graphics processing pipeline of FIG. 3B may be configured to generate and process, according to one embodiment of the present invention.

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Adaptively-Sized Cache Tiles

The cache tiles of FIG. 4 are sized to accommodate a particular render target configuration. A rendering target configuration includes one or more render targets, each of which includes one or more fields. The cache tile size is calculated based on the size of the various fields within the render targets of a given render target configuration.

Figure 5:
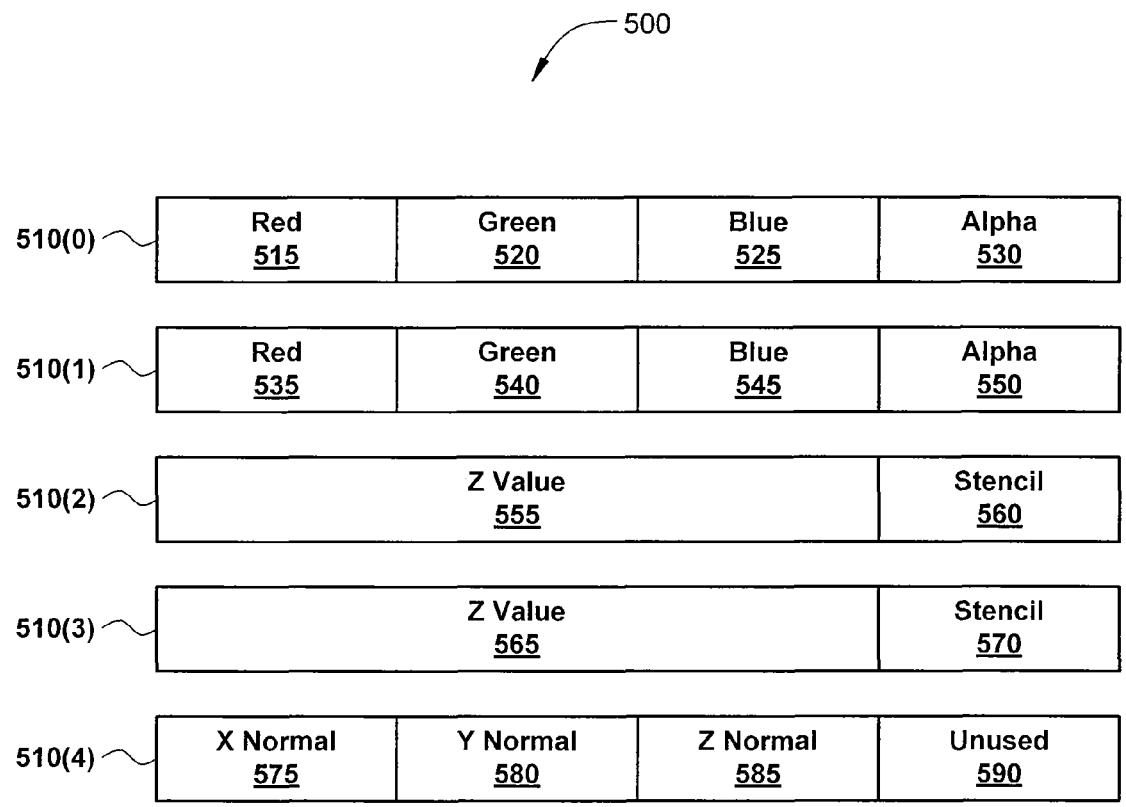
FIG. 5 illustrates a set of render targets as stored in one or more of the DRAMs of FIG. 2, according to one embodiment of the present invention.

FIG. 5 illustrates a set of render targets 599 as stored in one or more of the DRAMs 220 of FIG. 2, according to one embodiment of the present invention. As shown, the set of render targets 500 includes five separate render targets 510(0)-510(4).

The first render target 510(0) includes four fields representing a first set of color and transparency information associated with a corresponding sample or fragment. As shown, the four fields include a red value 515, green value 520, blue value 525, and alpha, or transparency, value 530. Each of the red value 515, green value 520, blue value 525, and alpha value 530 includes one byte of data. This first render target 520(0) may be designated C0, indicating that the first render target 510(0) includes a first set of color and alpha information.

The second render target 510(1) includes four fields representing a second set of color and transparency information associated with a corresponding sample or fragment. As shown, the four fields include a red value 535, green value 540, blue value 545, and alpha, or transparency, value 550. Each of the red value 535, green value 540, blue value 545, and alpha value 550 includes one byte of data. This second render target 520(1) may be designated C1, indicating that the second render target 510(1) includes a second set of color and alpha information.

The third render target 510(2) includes two fields representing a first set of depth and stencil information associated with a corresponding sample or fragment. As shown, the two fields include a z, or depth, value 555 and a stencil mask 560. As shown the z value 555 includes three bytes of data, while the stencil mask 560 includes one byte of data. This third render target 520(2) may be designated Z0, indicating that the third render target 510(2) includes a first set of z and stencil information.

The fourth render target 510(3) includes two fields representing a second set of depth and stencil information associated with a corresponding sample or fragment. As shown, the two fields include a z, or depth, value 565 and a stencil mask 570. As shown, the z value 565 includes three bytes of data, while the stencil mask 570 includes one byte of data. This fourth render target 520(3) may be designated Z1, indicating that the fourth render target 510(3) includes a second set of z and stencil information.

The fifth render target 510(4) includes four fields representing surface normal vector information associated with a corresponding sample or fragment. As shown, the four fields include an x-axis normal vector 575, a y-axis normal vector 580, and a z-axis normal vector 585. In this particular configuration for the fifth render target 510(4), the fourth field is an unused field 590. Each of the x-axis normal vector 575, y-axis normal vector 580, and z-axis normal vector 585 and unused field 590 includes one byte of data. This fifth render target 520(4) may be designated N0, indicating that the fifth render target 510(4) includes a first set of surface normal information.

The render target configuration changes as image rendering progresses. Each render target configuration includes the set of render targets used for a particular phase of image rendering. The cache tile may be flushed and resized at the boundary between a current render target configuration and a new render target configuration. In some embodiments, the cache tile many not be flushed and resized in cases where the new render target configuration is a subset of the current render target configuration.

Figure 6:
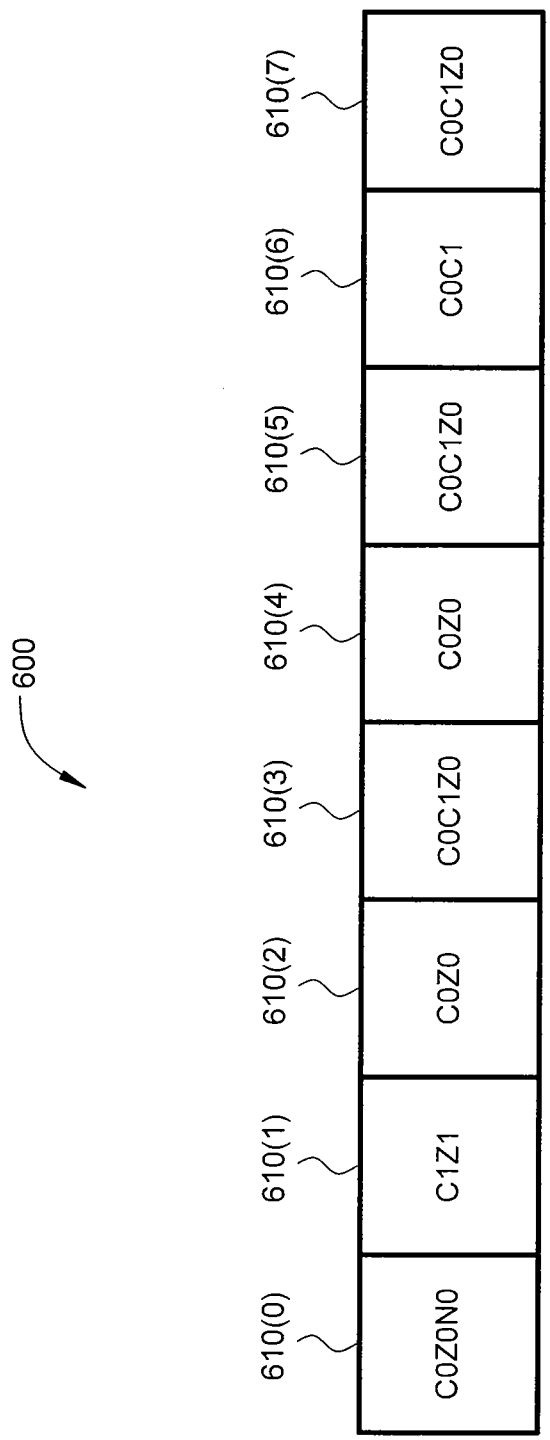
FIG. 6 illustrates a series of render target configurations associated with rendering a computer graphics image, according to one embodiment of the present invention.

FIG. 6 illustrates a series of render target configurations 600 associated with rendering a computer graphics image, according to one embodiment of the present invention. As shown, the series of render target configurations 600 includes eight render target configurations 610(0)-610(7) in a given sequence.

As rendering of the computer graphics image begins, the first render target configuration 610(0) specifies that the first color/alpha render target C0, the first Z/stencil render target Z0 and the normal vector render target N0 are used during this phase of rendering. Accordingly, this first render target configuration 610(0) is designated C0Z0N0.

A cache tile size is calculated based on the first render target configuration 610(0). First, the amount of cache memory consumed by the cache tile is divided by the memory space needed for each location in the first render target configuration 610(0), yielding the number of pixels in the cache tile. The memory space could be measured in terms of a quantity of bytes, or in any other suitable measure. This number of pixels is then used to determine the cache tile size. In one example, the size of the cache memory is 153,600 bytes and one-half of the cache memory is occupied by the cache tile. The amount of memory occupied by the cache tile would be 153,600/2 or 76,800 bytes. The number of bytes occupied by each location in the render target configuration 610(0) would be three render targets × four bytes per render target, or 12 bytes. The number of pixels in the cache tile would then be 76,800/12 or 6400 pixels. For square cache tiles, the cache tile would be $6400^{1/2}$ or 80 pixels wide×80 pixels high. Alternatively, the cache tile size could be technically feasible non-square format, such as 64 pixels wide×100 pixels high.

As rendering of the computer graphics image continues, the second render target configuration 610(1) specifies that the second color/alpha render target C1 and the second Z/stencil render target Z1 are used during this phase of rendering. Accordingly, this second render target configuration 610(1) is designated C1Z1. Because the render target configuration has changed, the cache tile is flushed, and a new cache tile size is calculated.

The new cache tile size is calculated based on the second render target configuration 610(1). In one example, the size of the cache memory is 153,600 bytes and one-half of the cache memory, 76,800 bytes, is occupied by the cache tile. The number of bytes occupied by each location in the render target configuration 610(1) would be two render targets× four bytes per render target, or 8 bytes. The number of pixels in the cache tile would then be 76,800/8 or 9600 pixels. For square cache tiles, the cache tile would be $9600^{1/2}$, which rounds up to 98 pixels wide×98 pixels high. Alternatively, the cache tile size could be technically feasible non-square format, such as 75 pixels wide×128 pixels high.

As rendering of the computer graphics image continues, the third render target configuration 610(2) specifies that the first color/alpha render target C0 and the first Z/stencil render target Z0 are used during this phase of rendering. Accordingly, this third render target configuration 610(2) is designated C0Z0. Because the render target configuration has changed, the cache tile is flushed, and a new cache tile size is calculated. In this case, the number of bytes corresponding to the third render target configuration 610(2) is the same as for the second render target configuration 610(1). Accordingly, the cache tile size does not change from the second render target configuration 610(1) to the third render target configuration 610(2).

As rendering of the computer graphics image continues, the fourth render target configuration 610(3) specifies that the first color/alpha render target C0, the second color/alpha render target C1, and the first Z/stencil render target Z0 are used during this phase of rendering. Accordingly, this fourth render target configuration 610(3) is designated C0C1Z0. Because the render target configuration has changed, the cache tile is flushed, and a new cache tile size is calculated. In this case, the number of bytes corresponding to the fourth render target configuration 610(3) is the same as for the first render target configuration 610(0). Accordingly, the cache tile size is calculated as described above in conjunction with the first render target configuration 610(0).

As rendering of the computer graphics image continues, the fifth through eight render target configurations 610(4)-610(7) specify render target configurations of C0Z0, C0C1Z0, C0C1, and C0C1Z0, respectively. In one embodiment, the cache tile may be flushed and a new cache tile may be calculated, as described above, as rendering progresses through each change in render target configuration 610. However, flushing and resizing the cache tile may be computationally expensive and may delay rendering with a new render target configuration 610 while the current cache tile is being flushed. In addition, flushing reduces the number of graphics primitives that may be tiled together in the cache tile, correspondingly reducing the benefit of tiling.

Accordingly, in another embodiment, the cache tile is neither flushed nor resized if a new render target configuration 610 represents a subset of the current render target configuration 610. This approach includes a situation where the new render target configuration 610 is the same as the current render target configuration 610. Such an approach may result in less efficient use of the cache memory. On the other hand, cache tile flushing and resizing may be reduced, which may result in greater efficiency and performance improvement, more than compensating for reduced efficiency of cache memory usage. In yet another embodiment, the improvement in cache memory efficiency resulting from changing the cache tile size may be compared with the performance improvement for not flushing and resizing the cache tile. The decision as to whether to keep the current cache tile configuration or to flush and resize the cache tile may then be made according to this comparison.

With this latter approach, each of the fifth through eighth render target configurations 610(4)-610(7) is a subset of the fourth render target configuration 610(3). As such, the cache tile size may remain as configured for the fourth render target configuration 610(3) while rendering progresses through the fifth through eighth render target configurations 610(4)-610(7). Alternatively, the cache tile may be flushed and resized and any or all of the changes in the fifth through eighth render target configurations 610(4)-610(7).

In one embodiment, the cache tile size may be modified according to the currently selected anti-aliasing mode. In anti-aliasing mode, multiple samples may be stored for each pixel location and later blended, resulting in improved image quality in the final rendered image. The anti-aliasing mode may be specified numerically, using designations such as AA-1, AA-2, AA-4, or AA-8, indicating that each pixel includes 1, 2, 4, or 8 samples, respectively. Accordingly, each cache tile pixel may consume 1, 2, 4, or 8 times the quantity of bytes, respectively, as compared to a cache tile pixel when no anti-aliasing is used. The cache tile size calculation may take the anti-aliasing mode into account when computing the cache tile size. For example, a cache tile could include 76,800 bytes in a render target configuration that occupies 12 bytes per pixel. Such a cache tile would include 6400 pixels with no anti-aliasing mode, as described above. With anti-aliasing mode, the cache tile would include 6400, 3200, 1600, or 800 pixels for AA-1, AA-2, AA-4, or AA-8 mode, respectively. If the cache tiles are square, each cache tile would be formatted as 80×80, 57×57, 40×40, or 29×29 pixels, respectively.

In some embodiments, the cache tiles may be larger to take advantage of the fact that the sample data for each pixel may be compressed at higher anti-aliasing modes. For example, anti-aliasing modes AA-1, AA-2, AA-4, or AA-8, could consume 1, 2, 3, or 5 times the quantity of bytes, respectively, as compared to a cache tile pixel when no anti-aliasing is used. The cache tile size calculation could take the anti-aliasing mode into account when computing the cache tile size. A cache tile could include 76,800 bytes in a render target configuration that occupies 12 bytes per pixel. Such a cache tile would include 6400 pixels with no anti-aliasing mode, as described above. With anti-aliasing mode, the cache tile would include 6400, 3200, 2134, or 1280 pixels for AA-1, AA-2, AA-4, or AA-8 mode, respectively. If the cache tiles are square, each cache tile would be formatted as 80×80, 57×57, 47×47, or 36×36 pixels, respectively.

In yet another embodiment, surface compression may be used to further increase the cache tile size. Surface data from the raster operations unit 395, such as ZROP and CROP data, may be stored in a compressed manner in the render targets 510. Such compressed surface data may be transferred to and from the L2 cache without decompressing and recompressing the data, reducing traffic between the render targets and the L2 cache. The compressed surface data may be stored in the L2 cache in a compressed format, reducing memory consumption in the L2 cache. The cache tile size calculation may be modified in a manner similar to the approach described above in conjunction with anti-aliasing mode, using the estimated or actual compression ratio associated with surface compression.

In another embodiment, where the cache tile resides in a unified cache memory, such as the L2 cache, described herein, a cache controller may further take advantage of other cache traffic to and from the render targets 510 to further reduce off-chip memory bandwidth and increase performance. Cache tiles may be stored in the L2 cache memory under an EVICT_NORMAL eviction policy, where cache tiles are subject to standard eviction rules that may apply to other data stored in the L2 cache that have the same eviction policy, such as data related to the ROP unit 395, VAF 360, and texture unit (not shown). As the geometric primitives for a particular cache tile are processed, the streaming multiprocessor 310 (via global load and global store operations), ROP 395, and texture unit may perform memory operations that are associated with the particular region of the screen that affect the cache tile. All such memory operations may be performed via the same L2 cache.

Caching data via a unified L2 cache, as described above, allows the cache controller to dynamically allocate the cache among various usages, including, without limitation, cache tile data, vertex attribute data, and texture data. For example, the cache controller could allocate a higher percentage of the cache memory for data other than cache tile data, such as texture data, resulting in improved cache performance for this other data. As such, the cache controller is not restricted to a static L2 cache partitioning, or to an architecture that includes a separate dedicated cache for cache tile data and a second dedicated cache for other data, such as vertex attribute data, and texture data. Rather, the cache controller dynamically selects partitioning of the single, unified L2 cache between cache tile data and other data, based on the current demands for the cache memory resources.

Because cache tile data accesses are subject to the same EVICT_NORMAL eviction policy as other L2 data traffic streams, the L2 cache includes no static partitioning between these different traffic streams. Accordingly, the cache controller may combine traffic between the L2 cache and portions of render target memory to further reduce traffic between the L2 cache and the render targets 510, taking advantage of through temporal and spatial locality of cache data.

In one example, the cache controller could combine write transactions that are directed to the same render target location from any of the ZROP unit, CROP unit or global memory accesses from the SM 310. The cache controller could combine these write transactions in the L2 cache via the write-back policy, while the cache tile resides in the L2 cache. The cache controller could then write the data from the L2 cache to the render targets 510 in a single transaction. This approach would take advantage of the spatial locality for write transactions associated with render target data.

In another example, because the square or rectangular shape of the cache tiles represent a region of neighboring pixels in the render targets 510, the cache controller could likely read neighboring memory addresses from the render targets. Such data could be fetched once from the render targets 510 and stored in the L2 cache. The read data could then be accessed multiple times while the data is resident in the L2 cache. This approach would take advantage of the spatial locality for read transactions associated with render target data.

In yet another example, memory read transactions directed to the same location in the render targets 510 could occur close together in time during image rendering. Overlapping primitives could access the same texture, where the texture coordinates are aligned to the cache tile coordinates. In such cases, the texture memory in the render targets 510 would be accessed multiple times, where the accesses would be near to each other in time. The cache controller could combine these accesses into a single read transaction directed to the texture memory in the render targets 510. This approach would take advantage of the temporal locality of render target data. In addition to texture accesses, similar benefits of temporal locality may be achieved for read and write accesses by ROP 395 and general global load and global store accesses by the SM 310. In some embodiments, the same approach may be used for accessing texture memory associated with a surface that is not a render target.

It will be appreciated that the architecture described herein is illustrative only and that variations and modifications are possible. In one example, the techniques are described herein in the context of a specific set of render targets 500 in a given configuration. However, the described techniques could be employed using any number of render targets 500. Each render target 510 could be configured independently of other render targets to include any number of fields. Such fields could include, without limitation 3D positional data, diffuse lighting information, and specular lighting information. Each field within a render target 510 could be configured independently of other fields to include any number of bits. In another example, although specific render target configurations 610 are shown in the series of render target configurations 600, any technically feasible render target configurations 610 could be specified. In yet another example, during rendering of a particular image, any series of render target configurations 600 could be employed, where any quantity of render target configurations 610 could be specified, and any render target configuration 610 could precede or follow any other render target configuration 610.

Figure 7:
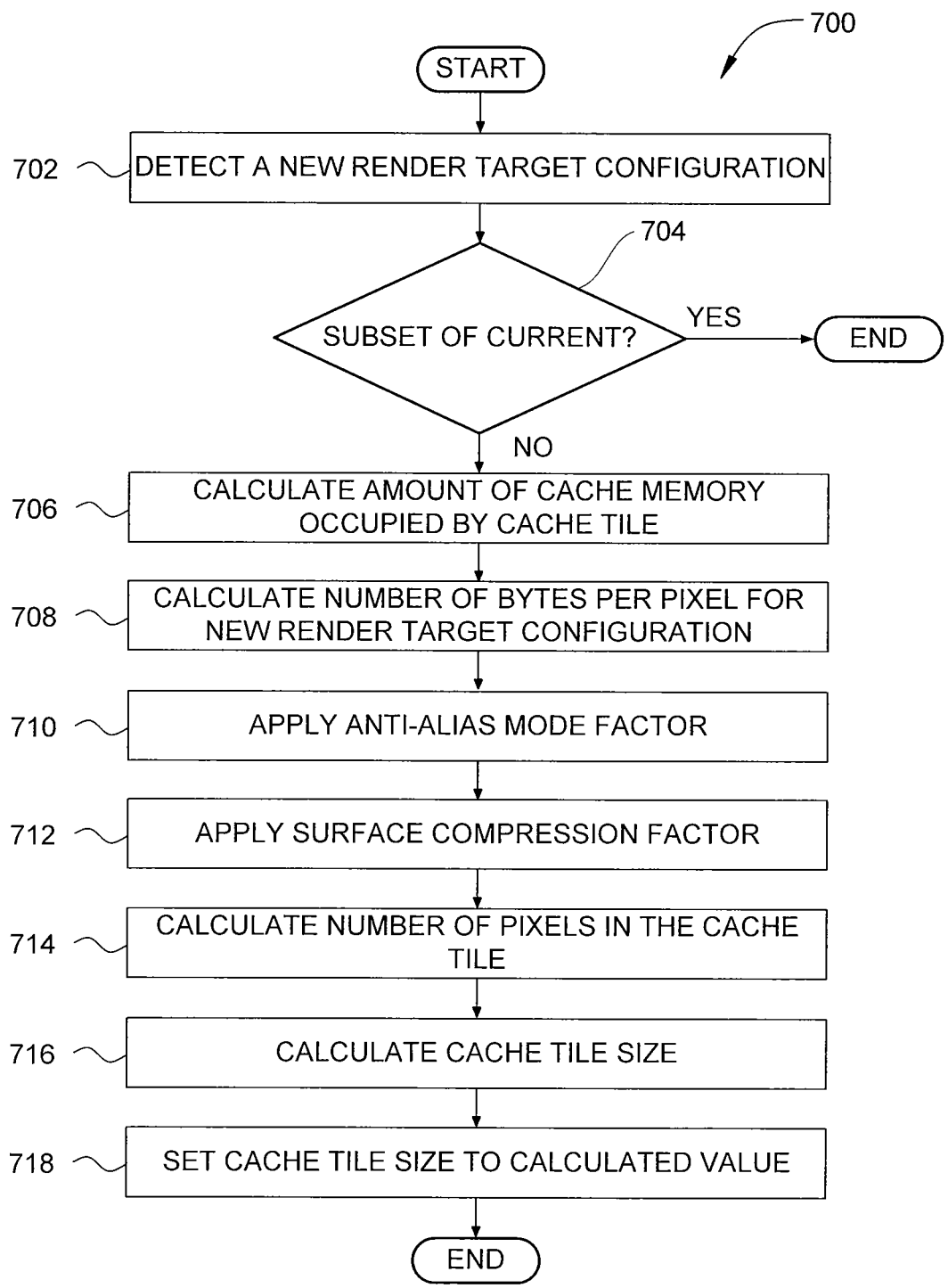
FIG. 7 sets forth a flow diagram of method steps for adaptively sizing cache tiles, according to one embodiment of the present invention.

FIG. 7 sets forth a flow diagram of method steps for adaptively sizing cache tiles, according to one embodiment of the present invention. Although the method steps are described in conjunction with the systems of FIGS. 1-6, persons of ordinary skill in the art will understand that any system configured to perform the method steps, in any order, is within the scope of the invention.

As shown, a method 700 begins at step 702, where the device driver 103 detects a new render target configuration that is different than a current render target configuration. The change in render target configuration may be due to the start of a new image render process or to a change from a current render target configuration to a new render target configuration during an image render process. At step 704, the device driver 103 determines whether the new render target configuration is a subset of the current render target configuration. If the new render target configuration is a subset of the current render target configuration, then the method 700 terminates.

If, however, the new render target configuration is not a subset of the current render target configuration, then the method 700 proceeds to step 706, where the device driver 103 calculates the cache memory space occupied by the cache tile. For example, the cache tile could occupy one-half or one-third of the total available cache memory. At step 708, the device driver 103 calculates the amount of memory space occupied by each pixel. For example, the device driver 103 could sum the number of bytes occupied by each field of each render target in the new render target configuration.

At step 710, the device driver 103 applies an anti-aliasing mode factor to the memory space calculation of step 708. In one example, the device driver 103 could multiply the memory space per pixel by a factor of 1, 2, 4, or 8 times for AA-1, AA-2, AA-4, or AA-8 modes, respectively. In another example, the device driver 103 could multiply the memory space per pixel by a factor of 1, 2, 3, or 5 times for AA-1, AA-2, AA-4, or AA-8 modes, respectively, accounting for the ability to compress pixels at higher anti-aliasing modes. At step 712, the device driver 103 applies a surface compression factor to the memory space calculation of step 708. For example, the device driver 103 could multiply the memory space per pixel by a factor based on an estimated or actual compression factor of ZROP data or CROP data.

At step 714, the device driver 103 calculates the number of pixels in the cache tile based on one or more of the following factors: the cache memory configuration, the new render target configuration, the anti-alias factor, and the surface compression factor. At step 716, the device driver 103 calculates the cache tile size. At step 718, the device driver 103 sets the cache tile size to the calculated cache tile size from step 716. The method 700 then terminates.

In sum, cache tiles are resized when a change is detected in render target configuration. The size of the cache tiles is based on the render target configuration as well as the cache configuration. The sum of bytes needed for a single location in each render target is calculated. The quantity of bytes in cache memory that is available for cache tiles is divided by this sum to determine the number of pixels in the cache tile. If the cache tile is square, then the square root of the number of pixels is calculated and rounded up to the nearest integer, resulting in the width and height of the cache tile. If the cache tile is non-square, then a width and height is chosen, where the product of the width and height is equal to at least the number of pixels.

The cache tile size may be chosen to accommodate multiple cache tiles in the cache memory, such that work for one or more cache tiles may be received while another cache tile is being processed. Where the cache tile resides in a general purpose cache, the cache tile size may be set to consume only a portion of the cache, such as one-half or one-third of the cache memory, leaving the remainder of the cache memory for other cache clients. Cache tile data may be compressed in order to further reduce the cache tile size, to take advantage of data efficiencies at higher anti-aliasing modes and surface compression, such as ZROP and CROP compression.

One advantage of the disclosed approach is that the cache tile size is adaptively sized based on render target configuration and cache configuration. Smaller cache tile sizes are selected for more complex render target configurations, while larger cache tile sizes are selected for less complex render target configurations. By adaptively sizing the cache tile based on the render target configuration, less compute power is needed to process the cache tiles, resulting in more efficient processor utilization and reduced power requirements. Another advantage of the disclosed approach is that, when compressed cache tile data is stored in the cache, the cache tile size may be further reduced, thereby increasing available cache memory even further. Alternatively, the cache tile size may remain the same size, and each cache tile may cover a larger portion of the screen surface. As a result, the total number of cache tiles may be reduced, resulting in less processing overhead related to tiling. In addition, a unified L2 cache tile allows dynamic partitioning of cache memory between cache tile data and other data, where the portion of the L2 cache allocated to various categories of data may vary based on current demands. Finally, the cache controller may reduce the quantity of render target accesses by combining read and write operations to the same render target issued by multiple clients by fetching render target data once and re-using the data multiple times to take advantage of spatial and temporal locality.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A non-transitory computer-readable storage medium including instructions that, when executed by a processor, cause the processor to adaptively size cache tiles in a graphics system, by performing the steps of:
setting a cache tile size associated with a first cache tile to a first size based on a first render target configuration that includes a first plurality of render targets, wherein the first cache tile is a screen-space tile and is comprised of a plurality of raster tiles, and the size of each raster tile is based on the cache tile size;
detecting a change from the first render target configuration to a second render target configuration that includes a second plurality of render targets, and
setting the cache tile size to a second size by:
determining an amount of cache memory occupied by the cache tile,
calculating a first number of bytes occupied per pixel across the second plurality of render targets,
applying a surface compression factor to the first number of bytes to compute a second number of bytes occupied per compressed pixel, and
calculating the second size based on the second number of bytes.

2. The non-transitory computer-readable medium of claim 1, further comprising determining that the second plurality of render targets does not comprise a subset of the first plurality of render targets.

3. The non-transitory computer-readable medium of claim 1, wherein at least one of the first size and the second size corresponds to a cache tile that does not have square dimensions.

4. The non-transitory computer-readable medium of claim 1, wherein the first size and the second size enable the first cache tile to be stored in a local cache memory residing within a graphics processor.

5. The non-transitory computer-readable medium of claim 4, wherein at least one of the first size and the second size is set to ensure that the first cache tile occupies no more than a first portion of the local cache memory.

6. The non-transitory computer-readable medium of claim 1, wherein a first raster tile included in the plurality of raster tiles is processed by a first graphics processing cluster and a second raster tile included in the plurality of raster tiles is processed by a second graphics processing cluster.

7. A method for adaptively sizing cache tiles in a graphics system, the method comprising:
setting a cache tile size associated with a first cache tile to a first size, wherein the first cache tile is a screen-space tile and is comprised of a plurality of raster tiles, and the size of each raster tile is based on the cache tile size, and wherein the raster tiles are processed by a plurality of graphics processing clusters residing within a graphics processor, each graphics processing cluster including a plurality of streaming multiprocessors;
detecting a change from a first render target configuration comprising a first plurality of render targets to a second render target configuration comprising a second plurality of render targets; and
setting the cache tile size to a second size by:
determining an amount of cache memory occupied by the cache tile,
calculating a first number of bytes occupied per pixel across the second plurality of render targets,
applying a surface compression factor to the first number of bytes to compute a second number of bytes occupied per compressed pixel, and
calculating the second size based on the second number of bytes.

8. The method of claim 7, further comprising determining that the second plurality of render targets does not comprise a subset of the first plurality of render targets.

9. The method of claim 8, wherein the second cache tile size is based on an amount of memory space allocated to each of the render targets in the second plurality of render targets.

10. The method of claim 9, wherein calculating the first number of bytes comprises multiplying a number of bytes occupied per pixel across the second plurality of render targets by an anti-aliasing factor.

11. The method of claim 7, wherein at least one of the first size and the second size corresponds to a cache tile that does not have square dimensions.

12. The method of claim 7, wherein first cache tile resides in a cache memory within a graphics processor.

13. The method of claim 12, wherein at least one of the first size and the second size is set to ensure that the first cache tile occupies no more than a first portion of the cache memory.

14. The method of claim 13, wherein the first portion of the cache memory comprises cache tile data and a second portion of the cache memory comprises texture data and vertex attribute data.

15. The method of claim 13, wherein a cache controller associated with the cache memory is configured to:
determine that a first data item residing in the first cache tile and a second data item residing in a second portion of the cache memory are directed to the same location in a first render target; and
write the first data item and the second data item to the first render target in a single transaction.

16. The method of claim 13, wherein a cache controller associated with the cache memory is configured to:
determine that a first data item residing in a first render target and a second data item residing in the first render target are scheduled to be loaded into the first cache tile, wherein the first data item and the second data item are stored in neighboring locations in the first render target; and
read the first data item and the second data item from the first render target in a single transaction.

17. The method of claim 13, wherein a cache controller associated with the cache memory is configured to:
determine that a first graphics primitive is dependent on a first data item residing in a first render target;
determine that a second graphics primitive is dependent on the first data item; and
read the first data item from the first render target in a single transaction.

18. A graphics system, comprising:
a processing unit; and a first memory coupled to the processing unit and storing a device driver that is configured to adaptively size cache tiles in the graphics system by:
    setting a cache tile size associated with a first cache tile to a first size, wherein the first cache tile is a screen-space tile and is comprised of a plurality of raster tiles, and the size of each raster tile is based on the cache tile size, and wherein the raster tiles are processed by a plurality of graphics processing clusters residing within a graphics processor, each graphics processing cluster including a plurality of streaming multiprocessors;
    detecting a change from a first render target configuration comprising a first plurality of render targets to a second render target configuration comprising a second plurality of render targets; and
    setting the cache tile size to a second size by:
        determining an amount of cache memory occupied by the cache tile,
        calculating a first number of bytes occupied per pixel across the second plurality of render targets,
        applying a surface compression factor to the first number of bytes to compute a second number of bytes occupied per compressed pixel, and
        calculating the second size based on the second number of bytes.

19. The graphics system of claim 18, further comprising:
a cache memory comprising:
    a first portion that includes a cache tile, and
    a second portion; and
a cache controller associated with the cache memory configured to:
    determine that a first data item residing in the first cache tile and a second data item residing in a second portion of the cache memory are directed to the same location in a first render target; and
    write the first data item and the second data item to the first render target in a single transaction.

20. The graphics system of claim 19, wherein the cache controller is further configured to:
    determine that a first data item residing in a first render target and a second data item residing in the first render target are scheduled to be loaded into the first cache tile, wherein the first data item and the second data item are stored in neighboring locations in the first render target; and
    read the first data item and the second data item from the first render target in a single transaction.

21. The graphics system of claim 19, wherein the cache controller is further configured to:
    determine that a first graphics primitive is dependent on a first data item residing in a first render target;
    determine that a second graphics primitive is dependent on the first data item; and
    read the first data item from the first render target in a single transaction.

* * * * *

UNITED STATES PATENT AND TRADEMARK OFFICE
CERTIFICATE OF CORRECTION

PATENT NO. : 9,734,548 B2
APPLICATION NO. : 14/012308
DATED : August 15, 2017
INVENTOR(S) : Ziyad S. Hakura et al.

It is certified that error appears in the above-identified patent and that said Letters Patent is hereby corrected as shown below:

In the Claims

Column 21, Claim 1, Line 26, please delete "targets," and insert --targets;--.

Signed and Sealed this
Twenty-sixth Day of December, 2017

Joseph Matal
*Performing the Functions and Duties of the
Under Secretary of Commerce for Intellectual Property and
Director of the United States Patent and Trademark Office*